United States Patent [19]

Looman et al.

[11] 3,950,482

[45] Apr. 13, 1976

[54] METHOD OF ROTATIONAL MOLDING VINYLCHLORIDE-ALKYLENE COPOLYMER

[75] Inventors: Wolfgang Looman; Wolfgang Pungs, both of Troisdorf; Egon Bierwirth, Porz-Urbach; Robert Buning, Troisdorf, Sieglar, all of Germany

[73] Assignee: Dynamit Nobel Aktiengesellschaft, Troisdorf, Germany

[22] Filed: Dec. 12, 1973

[21] Appl. No.: 424,232

Related U.S. Application Data

[60] Division of Ser. No. 330,920, Feb. 9, 1973, Pat. No. 3,887,728, which is a continuation of Ser. No. 117,690, Nov. 18, 1970, abandoned.

[30] Foreign Application Priority Data

Nov. 18, 1969 Germany............................ 1946612
Nov. 18, 1969 Germany............................ 1957824

[52] U.S. Cl............. 264/310; 260/87.5 C; 264/121
[51] Int. Cl.² ........................................... B29C 5/04
[58] Field of Search.................... 264/310, 121, 312; 260/87.5 C, 31.6, 31.2 R, 33.4 R

[56] References Cited
UNITED STATES PATENTS

| 2,736,925 | 3/1956 | Heisler et al........................ 264/310 |
| 3,468,840 | 9/1969 | Heiberger et al............. 260/87.5 C |
| 3,468,858 | 9/1969 | Heiberger et al............. 260/87.5 C |
| 3,468,859 | 9/1969 | Davies............................ 260/87.5 C |

FOREIGN PATENTS OR APPLICATIONS 757,550    4/1967   Canada.............................. 264/310

*Primary Examiner*—Jeffery R. Thurlow
*Attorney, Agent, or Firm*—Burgess, Dinklage & Sprung

[57] ABSTRACT

A copolymer of vinyl chloride with ethylene or propylene having a K-value of 45 to 65 and an alkylene (ethylene or propylene) content of 0.5 to 10 weight percent. This product is particularly useful for forming plasticizer-free coatings on substrates by known fluidized bed coating processes and for forming plasticizer-free shaped articles by rotational molding processes.

4 Claims, No Drawings

METHOD OF ROTATIONAL MOLDING VINYLCHLORIDE-ALKYLENE COPOLYMER

This is a division of application Ser. No. 330,920, filed Feb. 9, 1973, now U.S. Pat. No. 3,887,728 issued on June 3, 1975; which in turn is a continuation of Ser. No. 117,690, filed Nov. 18, 1970, now abandoned, which is in turn a continuation in part of Ser. No. 863,314, filed Oct. 2, 1969 and issued on Sept. 5, 1972 as U.S. Pat. No. 3,689,598 and also a continuation in part of Ser. No. 879,629, filed Nov. 24, 1969, now abandoned.

This invention relates to a novel use of particular vinylchloride polymers. It more particularly refers to plasticizer-free compositions based on vinylchloride polymers which are particularly well suited to use in rotational molding processes and in fluidized bed coating processes to form shaped articles of or, coated with such vinylchloride polymer.

It is known in the art that various molding compositions can be used in powder form for the production of surface coatings by the fluidized bed sintering process (see "Kunststoffe Hoechst-Wirbeesintern", a brochure published by Farbwerke Hoechst in August of 1967), and that many of these same polymeric molding compositions can be used in the production of articles, particularly hollow articles, by a known rotational molding process (see Rotationsschmelzen und Schleudergiessen von Kunststoffen, Carl Hanser Verlage, Munich 1968; E. Reichelt, Plaste und Kautschuk, 14 (1967) pp. 104–108). These known molding compositions are usually based on polyethylene, polyethylene-polyisobutylene mixtures, polyamides, mixed cellulose esters, epoxy resins, chlorinated polyethers, polycarbonates, polyacrylates, polystyrene, acrylonitrile-butadiene-styrene copolymers and plasticized polyvinyl chloride (see German Patent No. 1,223,085).

These molding compositions have been and are used mainly in powder or granular form but can be used partly as pastes.

In order to manufacture articles from polyvinyl chloride by means of the rotational molding process, it has hitherto been necessary to use molding compounds of plasticized polyvinyl chloride. These compounds have been worked in the form of pastes or also in the form of powders.

The presence of a plasticizer in the molding compound is undesirable in many new applications of molded polyvinyl chloride because of the greater inflammability, reduced resistance to chemical attack and poorer weathering characteristics which result from such use of plasticizers. Molded products which come in contact with foods must also be free of plasticizers because of the physiological effects of most plasticizers. Furthermore, the use of unplasticized molding compounds gives the products made therefrom better mechanical properties, such as greater rigidity, mechanical strength, thermal stability of shape, and better electrical characteristics.

It has been found, however, that unplasticized polyvinyl chloride molding compounds, within the usual meaning of the term, have deficient flow characteristics and fusion properties and are thermally damaged when worked by the rotational molding process. No improvement in this regard has been obtained even by the use of known auxiliary materials commonly used in the art to improve the flow charistics of the polymeric products to which they are added; e.g., polymethacrylates, poly-(vinyl chloride-vinyl esters), poly(ethylene-vinyl acetates), chlorinated polyethylenes and polyethylene waxes. Neither has any commercial success been obtained by the use of copolymers of vinyl chloride with maleic acid esters, fumaric acid esters, acrylic acid esters, vinyl esters or ethylene-vinyl acetate copolymers.

The presence of plasticizer is also undesirable in many surface coating applications. Plasticizer-free coatings are superior to those containing plasticizer chiefly due to their greater rigidity, mechanical strength, thermal stability of shape and better electrical properties. Additional advantages of plasticizer-free polyvinyl chloride compositions are the absence of plasticizer migration, low inflammability, improved resistance to chemicals and improved weathering resistance. Furthermore, coatings which come in contact with foodstuffs must also be free of plasticizers.

Polyvinyl chloride compositions suitable for the fluidized-bed coating (whirl sintering) process have therefore been prepared using small percentages of solvents and plasticizers for polyvinyl chloride, and the surfaces thus obtained have been subjected to a long heat treatment, after the sintering process, in order to reduce or remove the plasticizer.

It is furthermore known that under some circumstances coatings can be achieved on suitable surfaces by means of a plasticizer-free polyvinyl chloride composition suitable for fluidized-bed coating. The coatings obtained in the prior art, however, are porous and have to be subjected to thermal post-treatment in order to form a uniform pore structure.

Plasticizer-free polyvinyl chloride powder compositions, however, show poor flow and fusing characteristics in the fluidized-bed whirl sintering process. These properties cannot be sufficiently improved even by the use of known fluxes based on polymethacrylates, vinyl chloride-vinyl ester copolymers, ethylene-vinyl acetate copolymers, chlorinated polyethylenes or polyethylene waxes. The coatings thus obtained therefrom show thermal damage and are not satisfactory in regard to their pore structure, either.

Attempts to make plasticizer-free surface coatings from copolymers of vinyl chloride with maleic acid esters, fumaric acid esters, acrylic acid esters, vinyl esters or ethylene-vinyl acetate copolymers have also been unsuccessful.

It is an object of this invention to use plasticizer-free compositions based on vinyl chloride polymers to form shaped articles by rotational molding or to form coatings on substrates by the fluidized-bed (whirl) coating process.

Other and additional objects of this invention will become apparent from a consideration of this entire specification including the claims hereof.

In accord with and fulfilling these objects, one aspect of this invention resides in carrying out a rotational molding or whirl sintering process using as the molding composition a copolymer of 90 to 99.5 weight percent vinylchloride and 0.5 to 10 weight percent of at least one member selected from the group consisting of ethylene and propylene which copolymer has a K-value of 45 to 65. A preferred aspect of this invention is the use of a copolymer of 97 to 99.5 weight percent vinylchloride and 0.5 to 3 weight percent ethylene having a K-value of 50 to 65 in these applications. Another preferred aspect of this invention is the use of a copolymer of 90 to 99.5 weight percent vinylchloride and 0.5 to 10 weight percent propylene having a K-value of 45 to 60 in these applications.

An important attribute of this invention is the fact that the copolymer compositions set forth herein above are admirably suited to use as molding materials for a fluidized bed sintered coating or rotational molding processes without the necessity of providing any plasticizer in the molding composition. Thus an important aspect of this invention is a plasticizer-free powdered molding composition having as its principal or only polymeric component a copolymer of 90 to 99.5 weight percent vinylchloride and 0.5 to 10 weight percent of ethylene or propylene. Surprisingly it was found within the invention, that the copolymers posess extremely good fusing and melting characteristics as well as good flow characteristics which results in the production of very good surface coatings formed on preheated surfaces by this sinter-coating process.

The copolymers mentioned above can be prepared for example according to the process or processes disclosed in French patents Nos. 1,481,932 and 1,481,319.

It has been found that perfect molded articles can be obtained by the rotational molding process if copolymers are used having a particular content of propylene and a certain molecular weight characterized by their K-value.

The subject of the invention is a process for the manufacture of articles from powder form, unplasticized molding compositions based on vinylchloride polymers by the rotational molding process, which is characterized by the fact that a molding compound is used which is made from a vinylchloridepropylene copolymer having a propylene content of 1 to 10 weight percent and a K-value of 45 to 60.

The propylene content of the copolymer amounts preferably to from 1 to 5 percent. Best results are obtained with copolymers having a K-value of between 48 and 56.

A copolymer of vinylchloride with propylene, prepared by suspension or suspension-and-emulsion polymerization (Belgian Patents Nos. 668,471, 668,472 and 668,473), is known to be characterized by good rheological properties.

In order to be worked by the rotational molding process, a molding compound must have, in addition to excellent rheological properties, an especially good fusion characteristic. The copolymers of vinyl chloride with propylene which are used according to the invention are distinguished both by good rheological properties and by outstanding fusion characteristics on the basis of their speed and uniformity of fusion. The molded products made therefrom exhibit a superior shaping of corners and edges and a dense, smooth surface.

Due to its excellent fusion and flow characteristics, the molding composition used according to this invention is superior to the homo or copolymers that have been attempted to us used in this application hitherto.

For the preparation of a powdered molding material which can be worked by the rotational molding process, vinylchloride-propylene copolymer in proportions as set forth above is mixed cold, or is agglomerated while hot, using the working aids which will be described below. These mixtures are moldable, but the products made from them often have non-homogeneous areas and non-uniformly fused areas, as well as varying wall thicknesses. For this reason the molding composition, after being mixed hot or cold, is preferably subjected to a granulating process and the granules obtained are ground to powder. The powdery molding composition thus obtained should have a certain grain size distribution. Preferably, most of it has a grain size of about 0.15 to 0.30 mm, and especially 0.2 to 0.3 mm.

The high thermal stress to which the molding compound is subjected during the rotational molding process requires the use of highly effective stabilizers. Suitable commercial stabilizer systems can be used. The best stabilizers have proved to be Ba/Cd-soaps or organo-tin stabilizers containing synergistic additives, such as organic phosphites and epoxidized fatty acid esters, since these stabilizer combinations do not adversely affect the fusing characteristics of the polymer.

To improve the surface quality of the product and facilitate its removal from the mold, lubricants may also be added, e.g., those based on long-chain montanic acid esters having a carbon-atom chain length of about $C_{18}$ to $C_{36}$, with the greatest proportion being around $C_{28}$, or partially saponified products thereof, or partial glyceride fatty acid esters, or long-chain saturated alcohols having a carbon atom chain length of preferably $C_{16}$ and $C_{18}$, or polyethylene waxes having a molecular weight of preferably 2000 to 9000.

The incorporation of additional additives, such as light stabilizers, antioxidants, antistatic agents, and pigments and dyes, is possible. The addition of fillers, however, is permissible to only a limited extent because they detract from the rheological and fusion properties of the molding compound.

The modifiers commonly used for improving the physical and mechanical properties, such as impact strength, notch impact strength and break resistance, can be added. Whereas copolymers of ethylene with vinyl acetate, when used in the customary quantities, have only a slight adverse effect on the fusional properties, modifiers on a basis of methylmethacrylate-butadiene-styrene or acrylonitrile-butadiene-styrene or nitrile-rubber or vinylchloride-butadiene-acrylonitrile or vinylchloride-ethylene-vinyl acetate, or chlorinated polyethylene have a substantially greater adverse effect on the fusional properties of the molding compound and, therefore, can be used in only relatively slight amounts.

The molding compounds prepared according to the invention can be molded into products of any size on common rotational molding machines, which permit a rotation of the mold in two planes during the heating and cooling process. These rotational molding machines cause a powdered molding composition, such as one according to this invention, to contact the inner wall of a heated mold until the powder is suitably melted on the inner wall of a heated mold until the powder is suitably melted on the inner wall on the mold and then solidified thereon in the mold shape. The mold can be heated by preheated circulated air, direct gas heating, low-melting salt mixtures, and circulating heating bath fluids (e.g., suitable oils). For the cooling system, cold circulated air, water and water-air systems, as well as circulating oil can be used.

Rotational molding conditions for the molding compounds of this invention may vary in relation to the type of article being made. These conditions and operating parameters are generally as hereinafter stated. It has been found that temperature control has a decisive effect on the quality of the rotational molded article. A mold inner wall temperature of 180° to 200°C. has proven especially desirable. The heating and cooling times amount to 3 to 7 minutes each, depending on the heating and cooling system used, the wall thickness of the molded articles and the actual mold and the material of which it is made.

It has been found that substantially pore-free, smooth and entirely uniform plasticizer free vinylchloride polymer coatings can be obtained by the fluidized-bed sintering process by using as the fluidized-bed coating materials, copolymers of vinylchloride with 1 to 10 weight percent propylene having a K-value of 45 to 60.

The coatings obtained according to the invention are obtained by the fluidized-bed sintering process with a homogeneous and pore-free structure without the necessity of thermal post-treatment.

Preferably, copolymers having a molecular weight corresponding to K-values of 48 to 56 are used. The most favorable propylene content amounts to 1–5 weight percent.

The copolymer of vinylchloride with propylene, prepared by suspension or suspension-and-emulsion polymerization (Belgian Patents Nos. 668,471, 668,472 and 668,473) has good flow characteristic. For the fluidized-bed sintering process, however, a fluidizable composition must not only have excellent flow characteristics but must also have especially good fusing characteristics. The copolymers of vinylchloride with propylene which are used according to the invention have both good flow characteristics and outstanding fusion qualities. These qualities are measured on the basis of the speed and uniformity with which they melt. It is particularly because of these good fusion qualities that the copolymer used according to the invention is superior to the home and/or copolymers that have been used hitherto. Additionally, the surface-coated articles produced using this copolymer are characterized by dense, pore-free and glossy coatings.

In order to prepare a fluidizable powder composition, the vinylchloride-propylene copolymer is mixed cold or is agglomerated hot with known adjuvants by conventional methods. These mixtures can be used for fluidized-bed coating, but the coatings obtained with them often contain non-homogeneous and non-uniformly fused areas. Therefore, it is desirable to subject the cold-mixed or hot-mixed composition to a granulation process and to grind the granules to a powder before using such for surface coating.

The powdered composition should preferably have a certain grain size distribution. Most, and preferably all, of it should have a grain size of 0.04 to 0.50 mm, and preferably 0.10 to 0.30 mm.

The high thermal stresses to which the composition of this invention is subject during the sintering process necessitates the use of highly effective stabilizers. The appropriate commercially obtainable stabilizer systems can be used. Ba/Cd stabilizers and organo-tin stabilizers containing synergistic additives, such as organic phosphites and epoxidized fatty acid esters, have proven best since these stabilizer combinations do not adversely effect the fusion behavior of the copolymer.

To improve the quality of the coated surface, lubricants can be added to the fluidized-bed sintering powder, such as those based on long-chained montanic acid esters of a carbon atom chain length of about $C_{18}$ to $C_{36}$, predominating at around $C_{28}$ or partially saponified products thereof, or partial fatty acid esters of glycerin, or long-chained saturated alcohols having a carbon atom chain length of preferably about $C_{16}$ and $C_{18}$, or polyethylene waxes having a molecular weight of preferably about 2000 to 9000. The incorporation of other additives is also possible. Examples of these are conventional light stabilizers, antioxidants, antistatic agents, pigments, dyes and the like. the addition of fillers, however, is permissible only to a limited extent because high proportions adversely effect the fusion and flow characteristics of the composition.

To improve the physical and mechanical characteristics such as impact strength, notch impact strength and break resistance strength, the commonly used modifying agents can be used. Whereas copolymers of ethylene with vinyl acetate, when used in the customary quantities, have only a very slight adverse effect on the fusion qualities, modifiers based on methylmethacrylate-butadiene-styrene, acrylonitrile-butadiene-styrene, nitrile-rubber, vinylchloride-butadiene-acrylonitrile, vinylchloride-ethylene-vinyl acetate, or chlorinated polyethylenes have a much greater adverse effect on the fusion characteristics of the fluidized-bed sintering compound, and therefore, they can be used in only relatively small percentages.

In making surface coatings by the fluidized-bed process it has been found that temperature control affects the quality of the coating. It has been found to be especially desirable to preheat the workpiece to a temperature ranging from about 260° to 320°C in oder to make coatings with the fluidized-bed coating compositions according to the invention. The precise temperature used depends on the size and on the thermal conductivity of the material being coated. The time for which the body is immersed into the fluidized bed depends on the desired coating thickness and ranges from about 1 to 12 seconds, preferably from 3 to 7 seconds.

Furthermore, it has been found that a mixture of two or more coating materials having the same composition as above but different colors of any desired hue can be used in the process in any desired quantity ratio. Also, one component can be colorless or can be pigmented white.

It has surprisingly been found that, when plasticizer-free vinylchloride-propylene copolymers in powder form according to this invention having a different coloring but otherwise similar compositions, are combined in the preparation of a homogeneous, pore-free coating, special color effects are obtained so that, in the coating mass, the particles in two, three or more hues are fused randomly one beside the other, and they do not interfere chromatically with one another, as by streaking or by blending to form different hues, etc.

By colored fluidized-bed molding materials of similar composition is meant materials of the same vinylchloride-propylene copolymer containing the same proportions of the same lubricants, stabilizers, antioxidants, antistatic agents, etc., or also materials having the same vinylchloride-propylene copolymer but different composition or physical properties and contain additives differing in quantity and/or nature, providing they can be worked together and are compatible.

Organic pigments commonly used in the polyvinyl chloride manufacture such as the following can be used for coloring the fluidized-bed coating compositions:
PV fast dyes
phthalocyanine pigments
chromophthalate pigments
vat dyes
ultramarine colors;

also inorganic pigments such as:
chrome yellow pigments
cadmium pigment
titanium dioxide
molybdate red
chromium oxide green
or other known pigments of one of these types.

Inasmuch as the color selection among the organic and inorganic pigments commonly used in polyvinyl chloride manufacture, and the number of different colors, and the ratio in which the individually colored compounds can be combined are limited only by the optical distinguishability of the different colors, but are otherwise variable with complete freedom, a wide variety of different colorations is possible.

It has been found that a proportion of pigment of 0.01 to about 10 percent and a ratio between two differently colored compounds of 1 : 99 to 1 : 1, should be maintained as a general rule. Whitening and graying pigments will generally be added in quantities of approximately 1 to 8 percent, coloring pigments in quantities of about 0.02 to 0.5 percent and pigments of particularly strong coloring power in quantities of about 0.02 to 0.1 percent.

Both the physio-mechanical and chemical properties of the surface coating according to the invention, and the surface qualities, such as gloss, smoothness, freedom from pores, and uniformity, remain unchanged in comparison to the surface coating prepared from the said uncolored polymer composition.

The incorporation of additives, such as light stabilizers, antioxidants and antistatic agents, into the different homogeneously colored, plasticizer-free powder compositions, which are otherwise of the same make-up based on vinylchloride-propylene copolymers, is easily possible.

It has further been found that, inasmuch as the melting or fusion properties of the vinylchloride-ethylene copolymer are superior to those of the vinylchloride-propylene copolymer, vinylchloride copolymers having a smaller content of ethylene can be used while still maintaining equally good melting characteristics. It is thus possible to achieve melting properties in a vinylchloride-ethylene copolymer that are equally as good as those of a vinylchloride-propylene copolymer, by using an ethylene content that is approximately 25 to 50 wt-percent lower than the propylene content in the vinylchloride-propylene copolymer. On the other hand, for an equal content (in wt-percent) of ethylene in a vinylchloride-ethylene copolymer and propylene in a vinylchloride-propylene copolymer, it is possible to use a vinylchloride-ethylene copolymer having a K-value that is 2 to 5 units higher and still achieve the same melting characteristics.

Furthermore, when the ethylene content in the vinylchloride-ethylene copolymer is increased, the improvements achieved in the melting characteristics are greater than those achieved in vinylchloride-propylene copolymers when the propylene content is increased to the same extent. This makes it possible to use vinylchloride-ethylene copolymers having even higher K-values.

The use of fluidizable compositions based on vinylchloride-ethylene copolymer for the production of homogeneous, pore-free surface coatings additionally permits of polymers having a K-value of approximately 65, with correspondingly higher ethylene contents within the upper limit stated herein in order to achieve coatings having excellent mechanical properties. Equally good melting characteristics are not generally obtainable in a vinylchloride-propylene copolymer with a K-value of 65 with an equal content (in wt-percent) of propylene.

It is desirable to minimize the proportion of copolymerized ethylene in this case—when a vinylchloride polymer is required for the fluidized-bed coating process for reasons of chemical and weather resistance.

It has been found that the fluidized bed coating compositions can be prepared as differently colored compositions without any interference between the differently colored areas adjacent one another in the coating.

The coating thicknesses may amount to about 0.05 to about 2 mm, although greater and lesser thicknesses are both possible and practical.

A study of the mechanical properties of the described coating composition, measured on pressed plates 4 mm thick according to DIN standards 53,455 and 53,453 and VDE standard 0302 showed that the data are comparable with those of the corresponding unplasticized polyvinylchloride types, which are not usable in the fluidized-bed process. Vicat values have been found to be slightly lower, however, this is of little importance in the coating compositions, inasmuch as the stability of shape under exposure to heat is assured by the metal or ceramic support.

Of considerable advantage is the good impact strength and notch impact toughness in the cold state. Consequently, sheet metals coated by this process can be used, for example, for the manufacture of siding materials in building construction.

The following non-limiting Examples illustrate the practice of this invention. Parts and percentages given therein are by weight unless expressly stated to the contrary.

EXAMPLE 1

A fluidized-bed coating composition composed of 100 parts of a copolymer of 98.4 percent vinylchloride and 1.6 percent propylene and having a K-value of 53, plus 3.0 parts of a commercially available liquid organic tin stabilizer, 2.5 parts of a commercially available epoxidized fatty acid ester having an epoxy oxygen content of 6–6.5 percent, and 1 part of a montanic acid ester described in the specification were mixed hot by means of a high-speed mixer. This mixer was granulated and then crushed in an impact plate mill. The powdered molding compound had the required grain size distribution and did not require further screening.

A steel plate 5 mm thick was preheated for 20 minutes at 270° ± 5°C in a circulating air oven and then immersed into a fluidized bed of the above composition for 3 seconds.

The steel plate treated in this manner became coated with a glossy, smooth, pore-free, uniform layer in a thickness of 0.4 mm. Furthermore, no discoloration of the coating due to thermal damage to the fluidized-bed coating composition could be observed.

It was furthermore found that thermal post-treatment of the coating was not necessary.

A study of the mechanical properties of the coating compound described, measured as pressed plates 4 mm thick according to DIN Standards 53,455 and 53,453 and VDE Standard 0302, showed that the characteristics are comparable with those of the corresponding unplastixized PVC types, although the Vicat number is somewhat lower.

Tensile yield (kp/cm$^2$) — 575/550/555
Elongation (%) — 30/22/25
Impact strength (cmkp/cm$^2$, 20°C) — 5 specimens unbroken
Notch impact strength (cmkp/cm$^2$, 20°C) — 2.5/2.4/2.4
Vicat number (5kp, glycol) — 69/69/69

EXAMPLE 2

A copolymer of 95 percent vinyl chloride and 5 percent propylene having a K-value of 56 was used for the same coating process as described, under the same conditions of production, and using the same formulation given in Example 1.

This fluidized-bed coating compound also produced coatings having the same perfect quality as described.

The mechanical properties were likewise determined on the basis of 4 mm pressed plates:
Elastic limit (kp/cm$^2$) — 540/560/545
Elongation (%) — 30/ 35/ 27
Impact strength (cmkp/cm$^2$, 20°C) — 5 specimens unbroken
Notch impact strength (cmkp/cm$^2$, 20°C) — 2.7/2.8/2.6
Vicat number (5 kp, glycol) — 67/ 67/ 67

EXAMPLE 3

A fluidized-bed coating composition was prepared from 100 parts by weight of the copolymer described in Example 1, 1.0 parts by weight of didecyl phenyl phosphite, 3.0 parts of a commercially available solid barium-cadmium stabilizer, 2.5 parts of an epoxidized fatty acid ester having an epoxy oxygen content of 6–6.5 percent, 0.5 parts of a polyethylene wax already described above, and 0.5 parts by weight of a montanic acid ester already described above, and with it the described surface coating was prepared under the same conditions as described in Example 1. The coating had the same perfect quality.

The mechanical characteristics were determined in this case, too, in 4mm pressed plates.
Tensile yield (kp/cm$^2$) — 580/570/586
Elongation (%) — 40/ 37/ 44
Impact strength (cmkp/cm$^2$, 20°C) — 5 specimens unbroken
Notch impact strength (cmkp/cm$^2$, 20°C) — 2.6/2.5/2.6
Vicat number (5 kp, glycol) — 70/70 /70

The same qualitative experience, i.e., the production of a glossy, smooth, pore-free, uniform coating, was also obtained by the use of the copolymer of Example 2 in combination with the adjuvants of Example 3.

EXAMPLE 4

First two mixtures were prepared.

Mixture I

A fluidized-bed coating compound made up to 100 parts copolymer composed of 98.4 percent vinyl chloride and 1.6 percent propylene (K-value 53), plus 3 parts of a liquid organic tin stabilizer, 2.5 parts of an epoxidized fatty acid ester having an epoxy oxygen content of 6 to 6.5 percent and 1 part of a long-chained montanic acid ester having a carbon atom chain length of $C_{18}$ to $C_{36}$, predominating at around $C_{28}$, was mixed hot in a high-speed mixer. Pigmentation was accomplished with 0.5 percent Cadmopur red. This mixture was granulated and then crushed in an impact plate mill. The powdered molding material had the required grain size distribution and did not have to be further screened.

Mixture II

Preparation was the same as in Mixture I, but the pigmentation was performed with 5.0 percent titanium dioxide white.

Fluidized bed mixture (according to invention):

Mixture I and Mixture II were mixed in the approximate ratio of 1:1. Into the fluidized bed there was then immersed, for 3 to 7 seconds, a 5 mm thick steel plate which had been preheated in a circulating air oven for 20 minutes to 270°±5°C.

The workpiece thus treated thus became covered with a glossy smooth, pore-free, uniform coating in a thickness of 0.4 mm, and red and white mass particles appeared to have been fused alongside one another in random distribution in the coating, without interfering with one another chromatically.

Furthermore, no discoloration due to thermal damage to the fluidized-bed material could be observed, nor any differences in quality as compared to the workpieces coated according to the principal patent.

In like manner, Ba/Cd stabilizers containing synergistically active additives such as organic phosphates and epoxidized fatty acid esters proved to be usable instead of the stabilizers mentioned above.

EXAMPLE 5

Mixture I

A fluidized-bed compound was prepared from 100 parts of copolymer composed of 95 percent vinyl chloride and 5 percent propylene (K-value 56), 1.0 part didecyl phenyl phosphite, 3.0 parts of a solid barium-cadmium stabilizer, 2.5 parts of an epoxidized fatty acid ester having an epoxy oxygen content of 6 to 6.5 percent and 1 part of a long-chained montanic acid ester described above in Example 1, under the same conditions of preparation stated in Example 1. The pigmentation was performed with 0.1 percent ultramarine blue.

Mixture II

The preparation was performed on the basis of the same formulation.

The pigmentation was performed with 0.2 percent Cadmopur red.

Fluidized-bed mixture (according to the invention):

Mixtures I and II were mixed together in a ratio of 9:1, and were used, as described in Example 1, for the coating of a steel plate 5 mm thick.

Here again a glossy, smooth, pore-free, uniform coating developed on the plate and had a blue ground color shot through with red, chromatically unaffected mass particles corresponding to the percentage quantity of the colors stated above.

As substrates coated by the said process may be used metal plates (of iron, steel, copper, aluminum, etc.) or other shaped articles and articles formed from ceramics, glass or other metal oxides.

EXAMPLE 6

To prepare for a study of processing qualities, a molding compound consisting of 100 parts by weight of a copolymer composed of 98.4 percent vinyl chloride and 1.6 propylene and having a K-value of 53, plus 3.0 weight-parts of a solid barium-cadmium stabilizer, 1.0 weight-part of didecylphenyl phosphite, 2.5 weight parts of an epoxidized fatty acid ester having an epoxy oxygen content of 6 to 6.5 percent, 0.5 weight-part of a polyethylene wax already described above, and 0.5 weight-part of a partially saponified montanic acid ester already described above, was mixed by means of a high-speed mixer; this mixture was granulated and then ground in an impact-plate mill. The powdered molding compound had the required grainsize distribution and did not have to be screened.

By means of a rotational molding machine having a circulating oil heating and cooling system, a charge of 180 g of the molding compound was made into a container having a capacity of 1.5 l and a wall thickness of 1.5 mm, the mold wall temperature being 190°C, and the heating and cooling time being 5 and 4 minutes, respectively.

The box exhibited a pore-free, uniformly smooth surface, a uniform wall thickness and uniform arrises and corners. Furthermore, no discoloration due to thermal damage could be observed.

Tests for the mechanical characteristics of the above-described molding compound, performed on pressed plates 4 mm thick according to DIN Standards 53,455 and 53,453, and VDE Standard 0302, showed that the results were comparable with those obtained with the corresponding unplasticized polyvinyl chloride types, though the Vicat value is somewhat lower.

Tensile yield (kp/cm$^2$) — 560
Impact strength (cmkp/cm$^2$, 20°C) — 5 specimens unbroken
Elongation (%) — 25
Notch impact strength (cmkp/cm$^2$, 20°C) — 2.4
Vicat number (5 kp, glycol) — 69

EXAMPLE 7

A copolymer of 95 percent vinyl chloride and 5 percent propylene having a K-value of 56 was made into the same kind of box as described in Example 6, using the same formulation and the same conditions of production and preparation. This compound also yielded products of the same perfect quality.

In comparison with the molding compound named in Example 1, the product was found to have an improved transparency.

Again, the mechanical characteristics were determined on pressed plates 4 mm thick.

Tensile yield (kp/cm$^2$) — 550
Elongation (%) — 30
Impact strength (cmkp/cm$^2$, 20°C) — 5 specimens unbroken
Notch impact strength (cmkp/cm$^2$, 20°C) — 2.7
Vicat number (5 kp, glycol) — 67

The molding compounds prepared according to Example 6 and 7 are preferably suitable for the preparation of light-resistant, pigmented rotational molded articles.

EXAMPLE 8

A highly transparent molding compound was prepared from 100 parts by weight of the copolymer named in Example 6, 0.8 part of a solid dialkyl tin mercaptide, 2.0 parts of a dibutyl tin maleinate, 2.5 parts of the epoxidized fatty acid ester named in Example 6, and 0.5 parts of a long-chained montanic acid ester having a carbon-atom chain length of $C_{18}$ to $C_{36}$, the by far predominant chain length being $C_{28}$, and was rotational molded under the same conditions of preparation and processing as described in Example 6, the rotational molded product being the same as described above and having the same perfect quality.

The mechanical characteristics were determined in this case, too, on 4 mm pressed plates:
Tensile yield (kp/cm$^2$) — 590
Elongation (%) — 40
Impact strength (cmkp/cm$^2$, 20°C) — 5 specimens unbroken
Notch impact strength (cmkp/cm$^2$, 20°C) — 2.6
Vicat number (5 kp, glycol) — 71

The same qualitative experience, i.e., the manufacture of a highly transparent, perfect rotational molded article, was obtained when the copolymer of Example 7 was used in combination with the auxiliary products of Example 8.

EXAMPLE 9

A fluidized-bed coating composition consisting of 100 parts of a copolymer composed of 95 wt-percent vinyl chloride and 5 wt-percent ethylene and having a K-value of 64, plus 3.5 parts of the liquid stabilizer dibutyl tin mercaptide, 2.5 parts of an epoxidized fatty acid ester having an epoxy oxygen content of 6 to 6.5 wt-percent, 0.5 parts of a long-chained montanic acid ester with a carbon atom chain length of $C_{18}$ to $C_{36}$, the far greatest part being $C_{28}$, and 0.5 parts of a polyethylene wax having a molecular weight of about 9000, was mixed hot by means of a high-speed mixer.

This mixture was granulated and then crushed in an impact plate mill. The powdered molding compound had the required grain size distribution and did not need to be screened.

The following values were measured on a 4 mm pressed plate as the test specimen:
Tensile Yield (kp/cm$^2$) — 540
Elongation (%) — 29
Impact strength (cmkp/cm$^2$, 20°C) — 5 specimens unbroken
Notch impact strength (cmkp/cm$^2$, 20°C) — 4.4
Vicat number (5 kp, glycol) — 58

EXAMPLE 10

A copolymer consisting of 99 wt-percent vinyl chloride and 1 wt-percent ethylene and having a K-value of 55 was prepared using the formula given in Example 9, under the same conditions. The mechanical properties were also determined on the basis of 4 mm pressed plates:
Tensile Yield (kp/cm$^2$) — 520
Elongation(%) — 35
Impact strength (cmkp/cm$^2$, 20°C) — 5 specimens unbroken
Notch impact strength (cmkp/cm$^2$, 20°C) — 2.8
Vicat number (5 kp, glycol) — 60

EXAMPLE 11

A fluidized-bed coating compound was prepared from 100 parts by weight of a copolymer of 97.5 wt-percent vinyl chloride and 2.5 wt-percent ethylene having a K-value of 60, 1.0 part by weight of didecyl phenyl phosphite, 3.5 parts of a solid barium-cadmium stabilizer, 2.5 parts of an epoxidized fatty acid ester having an epoxy oxygen content of 6 to 6.5 wt-percent, 0.5 parts by weight of a polyethylene wax described above, and 0.5 parts of a partially saponified long-chained montanic acid ester having a carbon atom chain length of $C_{18}$ to $C_{36}$, the far greatest length being $C_{28}$, the conditions being the same as described in Example 9.

The mechanical properties were determined again on 4 mm pressed plates:

Tensile Yield (kp/cm²) — 540
Elongation(%) — 29
Impact strength (cmkp/cm², 20°C) — 5 specimens unbroken
Notch impact strength (cmkp/cm², 20°C) — 3.5
Vicat number (5 kp, glycol) — 58

A steel plate 5 mm thick, preheated for 20 minutes in a circulating air oven to 270°±5°C, was then immersed for 3 seconds in fluidized-beds using the copolymers of Examples 9, 10 and 11. The specimens treated in this manner were in all cases coated with a very glossy, smooth, pore-free, uniform coating 0.4 mm thick. Furthermore, no discoloration due to thermal damage to the polymer was observed. It was also found that thermal post-treatment to produce a pore-free coating was unnecessary.

EXAMPLES 12–14

Copolymers of vinyl chloride and ethylene as used in Examples 9, 10 and 11 with ethylene contents of 5.0, 1.0 and 2.5 weight percent respectively and admixed with the same described additives were granulated as in Example 6 into suitable molding material.

By using a commercially available rotational molding machine, three charges of 180 g each of this molding material were made into a box of 1.5 liter capacity. The inner wall of the molding machine had a temperature of 190°C which was maintained by circulating oil in the jacket thereof. The heating and cooling time was 5 to 4 minutes and the wall thickness of the box was 1.5 mm.

The formed boxes so produced had a uniformly smooth and pore-free surface. Mechanical characteristics of the formed boxes were substantially the same as the values given in Examples 9, 10 and 11, respectively for the molding materials therein.

What is claimed is:

1. In the process of forming a hollow shaped plasticizer-free article of a vinyl chloride polymer by rotational molding wherein a mold containing a vinyl chloride polymer is caused to be rotated through two planes while heated and thereafter cooled; the improvement which comprises utilizing as the molding composition a molding composition comprising a solid plasticizer-free copolymer consisting essentially of 90 to 99.5 weight percent vinyl chloride and 0.5 to 10 weight percent ethylene, said copolymer having a K value of 45 to 65 and being in particulate form and having a grain size of about 0.04 to 0.5 mm, said composition free of plasticizer, and maintaining the inner wall of the mold at about 180° to 200°C.

2. The improved process claimed in claim 1 wherein said molding composition has a particle size of about 0.15 to 0.3 mm.

3. The improved process claimed in claim 1 wherein said molding composition has a particle size of about 0.2 to 0.3 mm.

4. In the process of forming a hollow shaped plasticizer-free article of a vinyl chloride polymer by rotational molding wherein the mold containing a vinyl chloride polymer is caused to be rotated through two planes while heated and thereafter cooled; the improvement which comprises utilizing as the molding composition a composition comprising a solid plasticizer-free copolymer consisting essentially of 90–99.5 weight percent vinyl chloride and 0.5 to 10 weight percent propylene, said polymer having a K value of 45 to 65 and being in particulate form and having a grain size of about 0.04 to 0.5 mm, said composition free of plasticizer and maintaining the inner wall of the mold at about 180° to 200°C.

* * * * *